Figure 1:
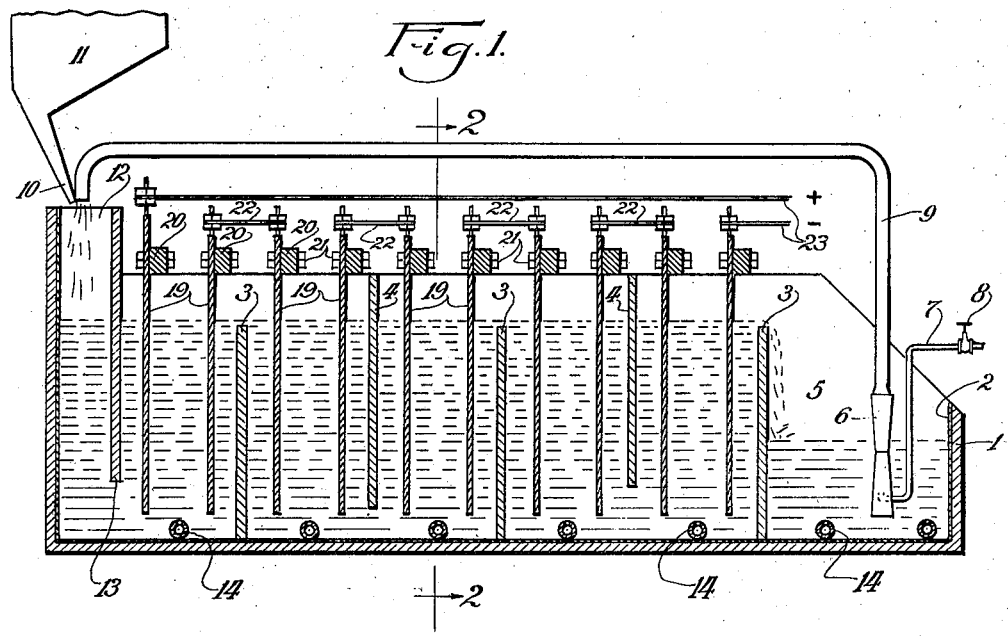

Sept. 21, 1926.   1,600,730
L. C. HAFFNER
PROCESS OF AND APPARATUS FOR USE IN ELECTROLYTIC PURIFICATION OF GRAPHITE
Filed July 31, 1922

Inventor:
Leonidas C. Haffner.
By Wallace R. Lane
Attys.

Patented Sept. 21, 1926.

1,600,730

UNITED STATES PATENT OFFICE.

LEONIDAS C. HAFFNER, OF CHICAGO, ILLINOIS.

PROCESS OF AND APPARATUS FOR USE IN ELECTROLYTIC PURIFICATION OF GRAPHITE.

Application filed July 31, 1922. Serial No. 578,596.

The present invention relates primarily though not exclusively to the separation of impurities from crude graphite. While the process is intended primarily for the treatment of graphite as it comes from the mines, it is not limited in its use to the treatment of this natural product, as it may also be used in the purification of graphite which has been previously treated to remove a portion of the natural impurities thereof.

Among the objects of my invention are to improve upon present methods of purifying graphite; to secure a method of purifying graphite which will be much more economical than previously existing methods; to make it possible to secure graphite with a lower percentage of impurities per unit of cost than is possible with the heretofore known methods; to provide an improved apparatus for the purpose specified; and such further objects, advantages, and capabilities as will later more fully appear.

My invention further resides in the combination, construction, and arrangement of parts illustrated more or less diagrammatically in the annexed drawing, and, while I have shown therein a preferred form of construction for carrying out my new process, it is to be understood that this is illustrative only and must not be considered as limiting my invention.

In the drawing annexed hereto and forming a part hereof.

Figure 2:
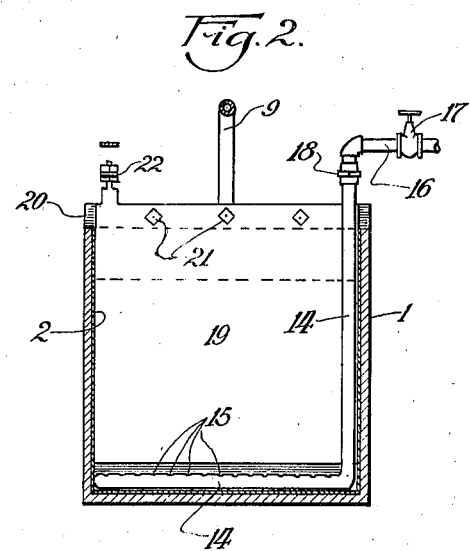

Fig. 1 is a longitudinal vertical section of an apparatus for carrying out my new process and Fig. 2 is a transverse section thereof substantially along the plane indicated by the line 2—2 Fig. 1.

In the annexed drawing numeral 1 designates a box preferably constructed of wood and lined with a lead lining 2. Within this box are baffles 3 and 4, the former rising from the bottom of the box and the latter depending from the top thereof so that the liquid flowing through the electrolytic chamber will alternately flow over the tops of walls or baffles 3 and then under the bottoms of baffles 4. The last baffle 3 cuts off, at the end of the chamber, a receptacle 5 into which the electrolyte falls when it passes over the top of the last baffle. An ejector 6 receives its air supply through a pipe 7 controlled by a valve 8 and is used to force the electrolyte from chamber 5 through pipe 9 to be delivered thereby in close proximity to the nozzle 10 at the bottom of bin 11. In this bin is put a ton or more of natural graphite and this gradually flows out through nozzle 10 to mix with the electrolyte passing through pipe 9 into chamber 12 of the electrolyzing apparatus. This mixture then passes downwardly under wall 13 and into the first cell of the electrolyzer which may consist of one or more cells, according to the available current. Located in the bottom of the electrolyzing chamber are pipes 14 provided in their upper faces with apertures 15, these pipes being fed with air by a pipe or pipes 16, the passage through which may be controlled by a valve 17. It will be understood that pipes 14 are preferably constructed of lead and are connected to pipes 16 by means of couplings 18. Baffles 3 and 4 and, in some cases, other wooden parts are preferably saturated with bituminous material.

A plurality of pairs of electrodes 19 extend downwardly from the top of the electrolyte tank and each is secured to a cross piece 20, resting on the top of the container 1, by means of bolts, or the like, 21. These couples of plates 19 dipping into the electrolyte form electrolyzing cells and are connected as shown by connectors 22. Current is supplied to these electrodes by means of conductors 23 and the arrangement of the cells will depend upon the strength of current available for this purpose. It is at present believed that a pressure of approximately one and seventy-five hundredths 90 volts between plates in a cell is preferable and that a current density of 10 amperes per plate can be advantageously used. It will thus be seen that if five cells are connected in series the potential should be approximately 9 volts, whereas, if the potential is between 5 and 6 volts, it will be preferable to connect three cells in series. On the other hand, if a higher voltage is used, more cells can be arranged in series. It will be perceived that several series of cells may be arranged in multiple, thus increasing the rate of operation of the apparatus.

While various substances may be used as the electrolyte, and this electrolyte may be either acidic or alkaline, it is at present considered preferable to use a weak solution of hydrochloric-acid in water as the means of carrying the electric current. In this application electrolysis is understood to mean the passage of current through a fluid mass capable of carrying ions.

It is at present considered best to use a liquid electrolyte which is a solvent of the impurities occurring with the powdered graphite. This graphite is kept suspended in the electrolytic solution by agitation and the electric current is passed between the anodes and cathodes, thus causing separation of the graphite and a portion of the impurities. If desired the purification may stop at this point, but it is preferable to remove the electrolyzed mixture from the chamber 5 to a filter, such as a drag filter or a continuous filter to remove the major portion of the liquid, after which the remaining mass may be dried and washed. Filtering and drying the graphite mass after electrolyzation seems to render it more possible to dissolve the chemical compounds adhering to the particles of graphite.

The natural impurities of graphite taken from a schistic geological formation, after mechanical purification, are silica, alumina, iron oxide, calcium oxide, magnesium oxide, sulphuric anhydride and divers alkalies, a typical analysis of flake graphite being the following:—

|  | Per cent. |
|---|---|
| Silica ($SiO_2$) | 1.88 |
| Iron oxide ($Fe_2O_3$) | 5.28 |
| Alumina ($Al_2O_3$) | 4.20 |
| Calcium oxide (CaO) | .21 |
| Magnesium oxide (MgO) | .38 |
| Sulphuric anhydride ($SO_3$) | .64 |
| Alkalies | .28 |
| Graphite | 87.00 |

As indicated above, this mass is run into the electrolyzer in close proximity to the stream of the inflowing electrolyte and therefore becomes thoroughly mixed with the same in the entrance end of the chamber 1. The mixture of graphite and electrolyte then flows through the electrolyzer, being kept thoroughly agitated by means of the current of air forced through the pipes 14. At the same time the current of electricity passing through the electrolytic cells causes reaction to take place between the electrolyte and the impurities. If the electrolyte used is an aqueous solution of hydrochloric acid, if the density and acidity of the electrolyte are adequate, and if the voltage of the cell is appropriate, iron and aluminum are deposited at the cathode as hydrates. Also, a certain amount of the iron and aluminum go into solution as $FeCl_3$ and $Al_2Cl_6$. The alkalies present react with the electrolyte, as will be obvious to one skilled in the art. Theoretically the silica is removed in the form of silicon tetrachloride, but it is found in practice that only a small portion, comparatively, reacts according to the theoretical equation which is as follows:

$$SiO_2 + 4Cl = SiCl_4 + O_2.$$

The iron and aluminum, also, do not fully follow the theoretical equation for the production of the hydroxide, as only 12%, approximately, is deposited in this form. The rest of the iron and aluminum seems to be converted into the respective chlorides. The silica which is theoretically transformed into silicon tetrachloride seems to be decomposed into colloidal silicon oxide which may be precipitated with ammonium hydrate, along with ferric chloride.

As will be readily understood, part of the compounds which are formed by the reactions indicated above pass into the solution and part of them remain attached to the graphite and are removed therefrom by the washing and drying processes referred to above. Apparently the heating during the drying process destroys the surface charges holding the graphite and soluble chemical compounds together and makes it possible to remove the latter by washing after the drying operation. If the adhering impurities amount to less than 10% drying and rewashing may not be considered necessary.

It is of course understood that the specific description of structure and methods set forth above may be departed from without departing from the spirit of my invention as set forth in this specification and the appended claims.

Having now described my invention, I claim:—

1. That part of the process of purifying graphite which comprises electrolyzing the impurities contained in a solution in which graphite is contained in suspension.

2. In the art of purification of graphite, the following steps: mixing the graphite and an electrolyte and then passing an electric current through the mixture.

3. A process of graphite purification which includes the following steps: mixing graphite containing impurities with an electrolyte, agitating the mixture to keep the graphite in suspension, and passing an electric current through the electrolyte.

4. That part of the process of purifying impure graphite which comprises introducing the graphite and an acidulated aqueous electrolyte into an electrolyzing chamber, maintaining the mixture in an agitated condition and passing an electric current through the mixture.

5. That part of the process of purifying graphite which comprises simultaneously introducing the graphite and an electrolyte into an electrolyzing chamber, forcing air through the resulting mixture to agitate the same and passing an electric current through the agitated mixture.

6. In the process of purifying graphite those steps comprising simultaneously introducing the graphite and an aqueous solution containing hydrochloric acid into an electrolyzing chamber, passing an electric current through the mixture in the chamber, and withdrawing electrolyte from the chamber to be introduced with fresh graphite.

7. In the process of purifying graphite, those steps which comprise simultaneously introducing the graphite and an electrolyte into an electrolyzing chamber, causing the mixture to flow serially through the cells of the chamber, agitating the mixture to keep the graphite in suspension, passing an electrolyzing current through the mixture, permitting the electrolyzed mixture to overflow into a receptacle, and withdrawing a part of the electrolyzed mixture from the receptacle for further treatment.

8. In the process of purifying graphite, those steps which comprise simultaneously introducing the graphite and an electrolyte into an electrolyzing chamber, causing the mixture to flow serially through the cells of the chamber, agitating the mixture to keep the graphite in suspension, passing an electrolyzing current through the mixture, permitting the electrolyzed mixture to overflow into a receptacle, withdrawing from the receptacle a part of the electrolyzed mixture to be introduced with fresh graphite, and withdrawing a part of the electrolyzed mixture from the receptacle for further treatment.

9. In the process of purifying graphite, those steps which comprise simultaneously introducing the graphite, and an alkaline electrolyte into an electrolyzing chamber, causing the mixture to flow through the chamber from end to end of the chamber and to overflow into a receptacle, maintaining the mixture in an agitated condition, and passing an electrolyzing current through the mixture.

10. The process of purifying graphite which comprises passing a mixture of an electrolyte and impure graphite through an electrolyzing chamber, agitating the mixture of electrolyte and graphite to retain the latter in suspension, passing the electrolyzed mixture from the chamber into a receptacle, withdrawing the electrolyzed mixture from said receptacle, separating the electrolyte from the graphite, drying and heating the graphite and re-washing and drying the graphite.

11. Apparatus for treating impure graphite comprising an electrolyte containing chamber divided into a plurality of chambers, means for introducing the graphite and electrolyte into one of the chambers, comprising a receptacle for holding a quantity of graphite and a pipe for conveying electrolyte, the receptacle and pipe having adjacent openings so that the graphite and electrolyte will be mixed as they enter the chamber, means immersed in the electrolyte through which an electrolyzing current may be passed, means whereby it is possible to keep the electrolyte and graphite in an agitated condition, means to receive electrolyte overflowing from the electrolyzing chamber, and means for returning part of the electrolyte from the receiving means to the entrance end of the apparatus.

12. Apparatus for treating impure graphite, comprising an electrolyte containing chamber divided into a plurality of chambers, a graphite container having a delivery opening in position to deliver graphite to one of the said chambers, a fluid carrying pipe having a delivery opening adjacent the aforesaid opening, so that graphite and fluid may be admitted in mixed condition to said chamber, means immersed in the electrolyte through which an electrolyzing current may be passed, means for introducing air jets into the electrolyzing chamber to keep the electrolyte and graphite in an agitated condition.

13. Apparatus for treating impure graphite, comprising an electrolyte containing chamber divided into a plurality of chambers, a graphite container having a delivery opening in position to deliver graphite to one of the said chambers, a fluid carrying pipe having a delivery opening adjacent the aforesaid opening, so that graphite and fluid may be admitted in mixed condition to said chamber, means for passing an electrolyzing current through an electrolyte contained in the chamber, means immersed in the electrolyte in the chamber for agitating the same by means of air jets and means for forcing part of the liquid in the apparatus through said pipe to cause it to mix with the entering graphite.

In witness whereof, I hereunto subscribe my name to this specification.

LEONIDAS C. HAFFNER.